US006501859B1

(12) United States Patent
Kajiwara (10) Patent No.: US 6,501,859 B1
(45) Date of Patent: Dec. 31, 2002

(54) IMAGE COMPRESSION USING WAVELET DATA OR ORIGINAL IMAGE DATA DEPENDING ON CODE AMOUNT

(75) Inventor: Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/370,198

(22) Filed: Aug. 9, 1999

(30) Foreign Application Priority Data

Aug. 24, 1998 (JP) .......................................... 10-237074

(51) Int. Cl.[7] .............................. G06K 9/36; G06K 9/46
(52) U.S. Cl. ...................................... 382/239; 382/240
(58) Field of Search ................................. 382/232, 166, 382/239, 240, 246, 247; 375/240.02, 240.11, 240.19, 240.23

(56) References Cited

U.S. PATENT DOCUMENTS 5,585,852 A * 12/1996 Agarwal ................ 375/240.11
5,945,930 A    8/1999 Kajiwara ..................... 341/50
5,953,460 A *  9/1999 Wu ............................ 382/239

OTHER PUBLICATIONS

Wallace, "The JPEG Still Picture Compression Standard", Feb. 1992, pp. xviii–xxxiv, IEEE Transactions on Comsumer Electronics, vol. 18, No. 1.*

* cited by examiner

Primary Examiner—Timothy M. Johnson
(74) Attorney, Agent, or Firm—Fitzpatrick, Cella, Harper & Scinto (57) ABSTRACT

This invention has as its object to implement efficient encoding in correspondence with the characteristics of an image in an arrangement that can transform an input image into a plurality of frequency bands. To achieve this object, an image processing apparatus has generation means for generating a plurality of sample values representing an image, transforming means for frequency-transforming the plurality of sample values into coefficients of a plurality of frequency bands, encoding means for generating first encoded data by encoding the plurality of sample values, and generating second encoded data by encoding the plurality of coefficients obtained by the transforming means, comparing means for comparing the amounts of the first and second encoded data obtained by encoding of the encoding means, and selection means for outputting one of the first and second encoded data in accordance with the comparison result of the comparing means.

11 Claims, 7 Drawing Sheets

IMAGE COMPRESSION USING WAVELET DATA OR ORIGINAL IMAGE DATA DEPENDING ON CODE AMOUNT

BACKGROUND OF THE INVENTION

1. Field of the Invention

The present invention relates to an image processing apparatus and method for encoding an image, and a storage medium that stores the method.

2. Related Background Art

Since images have a very large information size, the huge data size poses a problem when an image is stored or transmitted. Compression (encoding) of an image reduces the data size by removing redundancy of the image or manipulating values on levels that such manipulations are hard to visually recognize.

Conventionally, as one of still image encoding methods, JPEG internationally recommended by the ISO and ITU-T is known. JPEG will be briefly explained below since it is described in detail in ITU-T Recommendation T.81, ISO/IEC 10918-1, and the like. In JPEG, several kinds of encoding schemes are specified in correspondence with images to be encoded and applications. However, in its basic scheme except for a reversible process, an image is segmented into 8×8 blocks, the blocks undergo the discrete cosine transform (DCT), and transform coefficients are appropriately quantized and are then encoded. In this scheme, since the DCT is done in units of blocks, so-called block distortion is produced, i.e., block boundaries are visible when transform coefficients are coarsely quantized and encoded.

On the other hand, recently, encoding schemes based on the wavelet transform have been extensively studied, and various encoding schemes using this transform have been proposed. Since the wavelet transform does not use block division, it does not suffer any block distortion, and image quality at high compression ratio is superior to that of JPEG.

Figure 2:
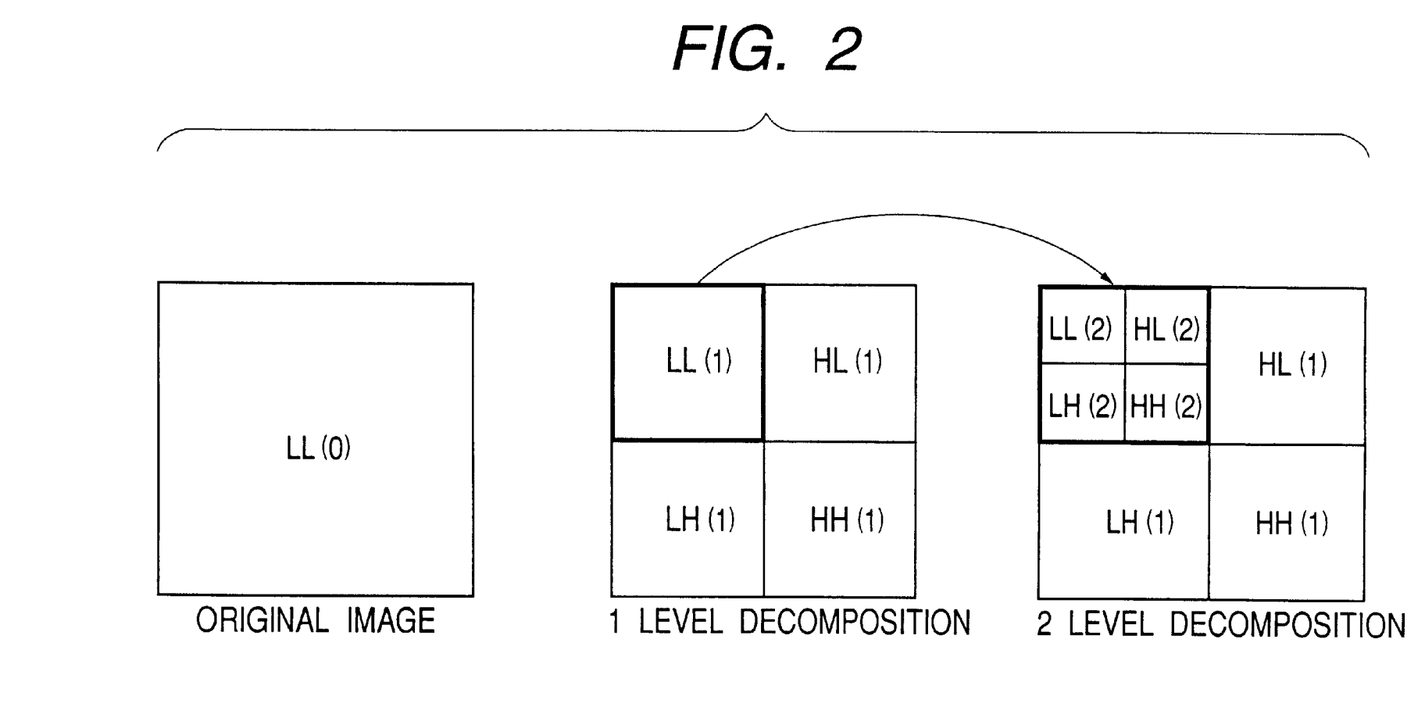
FIG. 2 is a view showing the repetition state of the discrete wavelet transform.

In the wavelet transform of an image, as shown in FIG. 2, an original image is divided into four frequency bands LL, HL, LH, and HH, and processes for further dividing the lowest frequency band (LL(1)) of these divided bands into four frequency bands, and further dividing the lowest frequency band (LL(2)) of these divided bands are repeated for a predetermined number of times, thus generating 3m+1 (the number of times of wavelet transform) kinds of frequency bands. The number of times of repetitions of the wavelet transform will be referred to as a level count hereinafter, and the respective frequency bands will be referred to as LL(m), HL(m), LH(m), and HH(m) by appending the level count to LL, HL, LH, and HH. For example, the LH component obtained by repeating the wavelet transform twice is expressed by LH(2).

Conventionally, it is often inappropriate to execute the wavelet transform for some types of images to be encoded. For example, as for a multi-valued binary image, limited color image, CG image, or the like, the coding efficiency can be improved when such image data undergoes a compression process as a post process of the wavelet transform before the wavelet transform, rather than the compression process after the wavelet transform.

Even when image data undergoes the wavelet transform, an appropriate number of times of wavelet transform (level count) varies depending on images, area (tile) sizes), characteristics, and the like, and a large number of times of wavelet transform does not always lead to improvement in compression performance.

SUMMARY OF THE INVENTION

The present invention has been made in consideration of the aforementioned problems, and has as its object to provide a novel image encoding scheme which can efficiently encode images with various characteristics.

More specifically, it is an object of the present invention to provide a technique for implementing efficient encoding in correspondence with the characteristics of an image to be encoded when an input image is encoded while being divided into a plurality of frequency bands.

In order to achieve the above objects, according to a preferred embodiment of the present invention, there is provided an image processing apparatus comprising:

generation means for generating a plurality of sample values representing an image;

transforming means for frequency-transforming the plurality of sample values into coefficients of a plurality of frequency bands;

encoding means for generating first encoded data by encoding the plurality of sample values, and generating second encoded data by encoding the plurality of coefficients obtained by the transforming means;

comparing means for comparing amounts of the first and second encoded data obtained by encoding of the encoding means; and selection means for outputting one of the first and second encoded data in accordance with a comparison result of the comparing means.

Other objects and features of the present invention will become apparent from the following description of the embodiments taken in conjunction with the accompanying drawings.

DESCRIPTION OF THE PREFERRED EMBODIMENTS

The preferred embodiments of the present invention will be described hereinafter.

First Embodiment

The preferred embodiment of the present invention will be described below with reference to the drawings.

Figure 1:
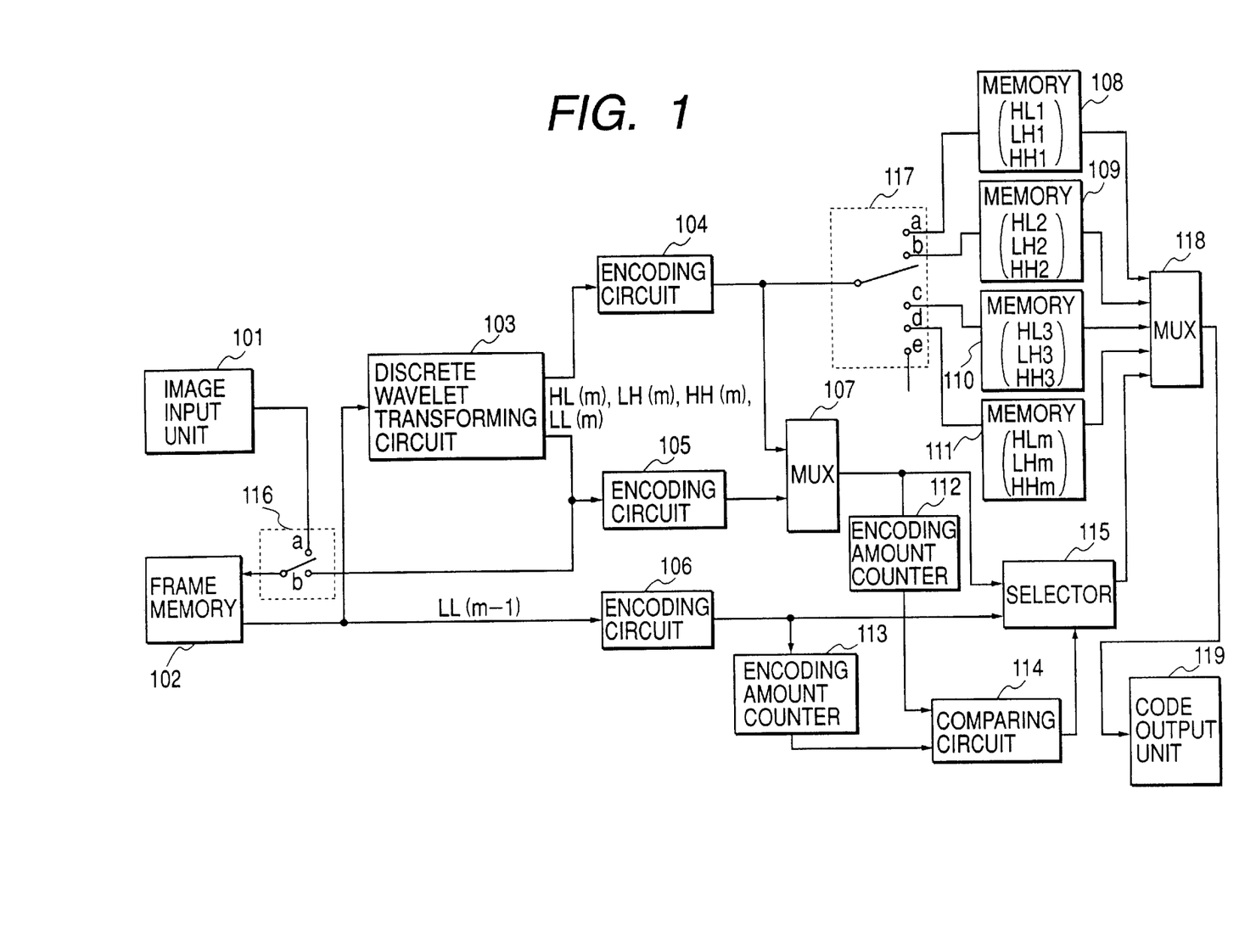
FIG. 1 is a block diagram of the first embodiment.

FIG. 1 is a block diagram showing an image processing apparatus for implementing the first embodiment of the present invention.

Referring to FIG. 1, an image input unit 101 inputs image data to be encoded. A frame memory 102 stores original image data (image data which is not wavelet-transformed, and is represented by LL(o) in the description of this embodiment) and the lowest frequency components LL(m) of the respective levels output from a discrete wavelet transforming circuit 103 (to be described below). The discrete wavelet transforming circuit 103 computes the discrete wavelet transforms of the image data and lowest frequency components LL(m) of the respective levels stored in the frame memory 102.

An encoding circuit 104 encodes frequency bands HL(m), LH(m), and HH(m) (m indicates the number of times of wavelet transform) of the respective levels output from the discrete wavelet transforming circuit 103. Encoding circuits 105 and 106 encode the lowest frequency components LL(m) of the respective levels output from the discrete wavelet transforming circuit 103. Note that the encoding schemes of the encoding circuits 105 and 106 are basically the same, and the encoding circuit 106 encodes LL(m−1) while the encoding circuit 105 encodes LL(m). For example, when the encoding circuit 105 encodes LL(1), the encoding circuit 106 encodes original image data LL(0); when the encoding circuit 105 encodes LL(2), the encoding circuit 106 encodes LL(1).

A multiplexer 107 multiplexes encoded data corresponding to frequency bands of an identical level. For example, the multiplexer 107 multiplexes three encoded data corresponding to HL(1), LH(1), and HH(1) output from the encoding circuit 104 to LL(1) output from the encoding circuit 105, and outputs encoded data corresponding to four frequency bands.

Memories 108, 109, 110, and 111 respectively store three encoded data corresponding to HL(m), LH(m), and HH(m). The memory 108 stores three encoded data corresponding to level 1, the memory 109 stores three encoded data corresponding to level 2, and the memory 110 stores three encoded data corresponding to level 3. These memories are prepared in correspondence with the number of required levels, and each memory sequentially stores three encoded data corresponding to level (m), as shown in the memory 111.

Encoding amount counters 112 and 113 count the code length. When the counter 112 counts the code length of encoded data corresponding to four frequency bands LL(m), HL(m), LH(m), and HH(m) output from the multiplexer 107 (encoding circuits 104 and 105), the counter 113 counts the code length of encoded data corresponding to LL(m−1) output from the encoding circuit 106.

A comparing circuit 114 compares the code lengths counted by the counters 112 and 113. A selector 115 selectively outputs one of a plurality of input encoded data. When the selector 115 receives encoded data corresponding to LL(m−1) from the encoding circuit 106, it receives encoded data corresponding to four frequency bands LL(m), HL(m), LH(m), and HH(m) from the multiplexer 107. For example, when the selector 115 receives data obtained by directly encoding original image data LL(0), it receives encoded data corresponding to four frequency bands LL(1), HL(1), LH(1), and HH(1) from the multiplexer 107; when the selector 115 receives data obtained by encoding LL(1) from the encoding circuit 106, it receives encoded data corresponding to four frequency bands LL(2), HL(2), LH(2), and HH(2) from the multiplexer 107.

Switches 116 and 117 are used for switching the data flow, and are connected to terminals a initially before encoding. A multiplexer 118 multiplexes encoded data which are finally determined to be required. A code output unit outputs encoded data to an external device or another processing unit in the apparatus. In this embodiment, assume that an image to be encoded input from the image input unit is a monochrome multi-valued image which is expressed by 8 bits per pixel. However, the present invention is not limited to such specific image, and may be applied to a case wherein color multi-valued images expressed by color components such as RGB, CMYK, and the like, and luminance and chromaticity components such as Lab, YCrCb, and the like are to be encoded. Such case can be implemented by sequentially encoding each image component as one monochrome multi-valued image.

The operations of the respective units in this embodiment will be described in detail below.

The image input unit 101 inputs original image data LL(0) indicating an image to be encoded for one frame in units of pixels in the raster-scan order, and the frame memory 102 stores the input image data. Note that the image input unit 101 may comprise, e.g., an image sensing device such as a scanner, a digital camera or the like, an interface for a network line, or the like.

Upon completion of storage of all the pixels of image data (for one frame in this embodiment), the switch 116 is set to be connected to terminal b. In this setup, the switch 116 is connected to terminal a after final encoded data corresponding to this image data is output from the multiplexer 118.

Figure 6:
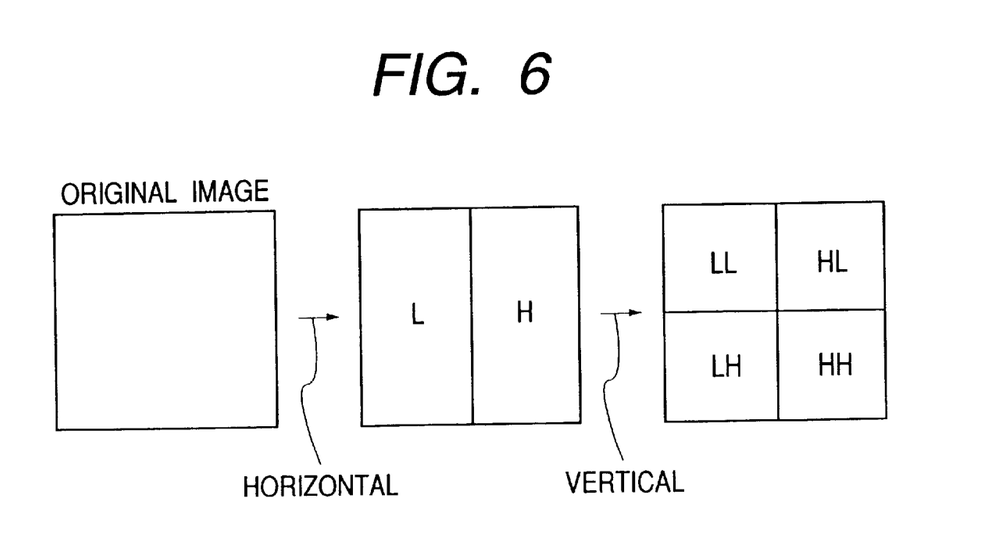
FIG. 6 is a view showing the process of the two-dimensional discrete wavelet transform.

Subsequently, the discrete wavelet transforming circuit 103 computes the discrete wavelet transforms shown in FIG. 2 of the image data stored in the frame memory 102, and decomposes the image data into four different frequency bands (to be referred to as sub-bands hereinafter). In this embodiment, the discrete wavelet transform of an image data sequence x(n) is computed by:

$$r(n)=[(x(2n)+x(2n+1))/2]$$

$$d(n)=x(2n)+x(2n+1)$$

where [a] indicates a maximum integer that does not exceed a. r(n) and d(n) are transform coefficients, and respectively indicate low- and high-frequency components. These transformation formulas are for linear data. By applying this transformation in the order of the horizontal and vertical directions, as shown in FIG. 6, the image data can be decomposed into four sub-bands LL(m), HL(m), LH(m), and HH(m) (initially, LL(1), HL(1), LH(1), and HH(1)).

Coefficients of the sub-bands other than the LL(m) sub-band are output to the encoding circuit 104 in the order of HL(m), LH(m), and HH(m), and those of the LL(m) sub-band are output to the encoding circuit 105 and are stored in a free area in the frame memory 102.

The encoding circuit 105 encodes the coefficients that form the LL(m) (initially, LL(1)) sub-band by the JPEG reversible process (predictive coding +entropy coding in units of coefficients). Since the JPEG reversible process is described in the recommendations ITU-T T.81 and ISO/IEC 10918-1, a detailed description thereof will be omitted. In the JPEG reversible process, one of Huffman coding and arithmetic coding can be selected as entropy coding. In this embodiment, Huffman coding is used. On the other hand, as prediction schemes of pixel values, seven different prediction schemes can be selected. This embodiment uses plane prediction (a scheme using Ra+Rb−Rc as a predicted value). Note that Ra, Rb, and Rc in that prediction scheme are values corresponding to left neighboring, upper neighboring, and upper left coefficients of the coefficient to be encoded.

The encoding circuit 104 encodes coefficients that form HL(m), LH(m), and HH(m) sub-bands other than the LL(m) sub-band in turn.

In the encoding process of each sub-band, block division is repeated while referring to the values of coefficients that form the sub-band, so as to output block division information, and sign codes of coefficients that form a block equal to a minimum block size (2×2 pixels in this embodiment) obtained by division, and absolute values of the coefficients are output.

The encoding process of the encoding circuit 104 will be described in detail below with reference to the flow chart shown in FIG. 7.

Prior to block division executed by the encoding circuit 104, an initial value of a number n of a bit plane of interest is set. As the number n of a bit plane, the LSB plane has a number n=0, and the number is incremented in unitary increments toward the MSB plane. For example, when a transform coefficient input to the encoding circuit 104 is 8-bit data per pixel, the bit plane number ranges from 0 to 7, and the MSB plane number is 7.

The initial value of the number n of the bit plane of interest is set at the theoretical maximum number of bits required for expressing the absolute value of a transform coefficient that forms the input sub-band.

Initially, the encoding circuit 104 sets the entire sub-band to be encoded (one of HL(m), LH(m), and HH(m)) as a block to be processed (first block of interest). In step 701, a maximum value Cmax of the absolute values of the coefficients which form the block of interest is obtained, and is compared with a threshold value $2^n-1$ determined by the number n of bits of interest. If Cmax is larger than the threshold value $2^n-1$, the flow advances to step 705; otherwise, the flow advances to step 702.

That is, this checking process amounts to expressing the absolute value of the coefficient that forms the block of interest by a natural binary number and dividing it into bit planes, and checking if bits of the bit plane of interest are all "0"s (in the first checking process, it is checked if bits on the MSB plane are all "0"s).

In step 702, since bits on the bit plane of interest are all "0"s, "0" indicating that the block is not divided in that bit plane is output as block division information.

In step 703, the value n is checked. If n is larger than 0, i.e., if the bit plane of interest has not reached the MSB bit plane yet, the flow advances to step 704; otherwise, the process for the block of interest ends. Subsequently, in step 704, the immediately lower bit plane is selected as the bit plane of interest by decrementing the value n by 1, and the flow returns to the process starting from step 701.

On the other hand, in step 705, since at least one "1" is present on the bit plane of interest, the block of interest is further broken up to proceed with the process. Hence, "1" indicating that the block of interest is divided is output as block division information.

In step 706, the size of the block of interest is compared to a predetermined minimum block size (2×2 pixels in this embodiment). If the size of the block of interest is larger than the minimum block size (i.e., a size equal to or larger than 4×4 pixels), it is determined that the block of interest is to be further divided, and the flow advances to step 707; otherwise (if the size of the block of interest has reached a size that need not be further divided), the flow advances to step 708.

In step 707, the block of interest is further divided into four sub-blocks, and the process from step 701 is started using each of these sub-blocks as the block of interest. Note that the initial value of the number of the bit plane of interest upon re-processing each sub-block uses the latest number n at that time (at the time of division).

On the other hand, in step 708, the absolute values of the coefficients (2×2 coefficients in this case) that form the block of interest are expressed by n-bit natural binary numbers at that time one by one in the raster-scan order, and are output in turn from the MSB. As for a coefficient whose value is not zero, a sign code (if "+", "0"; if "−", "1") is also output.

By repeating the aforementioned division processes, all the coefficients of HL(m), LH(m), and HH(m) are converted into block division information output in steps 705 and 702, and coefficient values and sign codes output in step 708.

The encoded data corresponding to the HL(m), LH(m), and HH(m) sub-bands generated by the encoding circuit 104 are stored in the order of memories 108 to 111 selected by the switch 117. As described above, since the switch 117 is initially connected to terminal a upon image encoding, encoded data (those corresponding to the HL(1), LH(1), and HH(1) sub-bands) initially output from the encoding circuit 104 are stored in the memory 108. Upon repeating the processes, as will be described later, when encoded data corresponding to the HL(2), LH(2), and HH(2) sub-bands are output, they are stored in the memory 109; when encoded data corresponding to the HL(3), LH(3), and HH(3) sub-bands are output, they are stored in the memory 110; and encoded data corresponding to sub-bands up to HL(m), LH(m), and HH(m) can be stored in the similar memory 111.

The encoded data output from corresponding to the HL(m), LH(m), and HH(m) (initially, HL(1), LH(1), and HH(1)) sub-bands output from the encoding circuit 104 are also output to the multiplexer 107, which multiplexes these data to encoded data corresponding to the frequency band LL(m) (initially, LL(1)) of the identical level generated by the encoding circuit 105 and outputs encoded data multiplexed in the order corresponding to LL(m), HL(m), LH(m), and HH(m).

The encoding amount counter 112 counts the code length of the encoded data (initially, the multiplexed encoded data of LL(1), HL(1), LH(1), and HH(1)) output from the multiplexer 107, and outputs that code length to the comparing circuit 114.

Parallel to the aforementioned processes, the encoding circuit 106 encodes the latest data LL(m−1) (initially, original image data LL(0), and image data changes to LL(1), LL2(2), . . . upon repeating the processes, as will be described later) stored in the frame memory. The encoding scheme of this encoding circuit 106 is the JPEG reversible process as in the encoding circuit 105, and predictive coding in units of pixels (or coefficients) (plane prediction that outputs a predicted value Ra+Rb−Rc using values Ra, Rb, and Rc of left neighboring, upper neighboring, and upper left pixels (or coefficients)+entropy coding (Huffman coding) are similarly executed. The encoded data corresponding to LL(m−1) (initially, original image data LL(0)) obtained by this encoding circuit is parallelly output to the selector 115 in the same manner as the encoded data corresponding to LL(m), HL(m), LH(m), and HH(m) (initially, LL(1), HL(1), LH(1), and HH(1)).

The encoding amount counter 113 counts the code length of the encoded data (initially, encoded data corresponding to original image data LL(0)) output from the encoding circuit 106, and outputs that code length to the comparing circuit 114.

The comparing circuit 114 compares the code lengths output from the encoding amount counters 112 and 113, and outputs the comparison result to the selector 115. The comparison result assumes "0" or "1": when the code length counted by the encoding amount counter 112, i.e., that of the encoded data output from the multiplexer 107, is smaller than the code length counted by the encoding amount counter 113, i.e., that of the encoded data output from the encoding circuit 106, "0" is output; otherwise, "1" is output.

The selector 115 operates when the switch 117 is connected to terminal e (i.e., when the number of times of discrete wavelet transform in the apparatus has reached m as the maximum value, and the discrete wavelet transform is to end), or when the comparison result output from the comparing circuit 114 becomes "1" (i.e., when coding efficiency obtained upon directly encoding the low-frequency component LL(m−1) before division is higher than that obtained upon encoding by dividing data into four sub-bands LL(m), HL(m), LH(m), and HH(m) (by computing discrete wavelet transforms)).

On the other hand, the selector 115 outputs the encoded data received from the multiplexer 107 only when the switch 117 is connected to terminal e and the comparison result output from the comparing circuit 114 becomes "0" (i.e., coding efficiency obtained upon encoding by further by dividing data into four sub-bands LL(m), HL(m), LH(m), and HH(m) (by computing discrete wavelet transforms) is higher than that obtained upon directly encoding the low-frequency component LL(m−1) before division).

In other cases, i.e., when the comparison result output from the comparing circuit 114 becomes "1" irrespective of the connection of the switch 117 to terminal e, the selector 115 outputs the encoded data output from the encoding circuit 106.

When the selector 115 outputs the encoded data, subsequent repetition operations (to be described later) of the discrete wavelet transforming circuit 103 and encoding circuits 104, 105, and 106 end. In this manner, since the discrete wavelet transform need not be computed more than required, the load on the encoding processes can be reduced.

The repetition process of the encoding process and encoding amount comparison will be explained below.

When the selector 115 does not satisfy the aforementioned operation condition, coding efficiency may improve by further dividing the lowest frequency band LL(m) (by computing discrete wavelet transforms). Hence, another encoding amount comparison is done by updating m by +1. In this case, the discrete wavelet transform, encoding processes of the encoding circuits 104 to 106, encoding amount counting, and selection operation checking of the selector 115 are done for the already stored LL(m) (LL(1) in the first repetition process) in the same manner as LL(m−1) described above. In this repetition process, HL(m), LH(m), and HH(m) described above need not be considered since they are not further divided (do not undergo the discrete wavelet transform). Hence, the encoded data alone can be reliably held in the memory 108.

Therefore, the switch 117 is switched to the next terminal. For example, when the switch 117 is connected to terminal a (initial state), it is switched to terminal b; when terminal b, terminal c; when terminal c, terminal d (switching to terminals c and d is determined in accordance with the maximum number of times of wavelet transform); and when terminal d, terminal e.

After the switch is switched, the latest data LL(m) (LL(1) in case of the first repetition) already stored in the frame memory 102 undergoes a series of processes which are the same as those for the previously processed data LL(m−1) (original image data LL(0) in case of the first repetition).

To help understand the processes, they will be briefly explained below. When data LL(1) undergoes the same processes, the discrete wavelet transforming circuit 103 generates frequency bands LL(2), HL(2), LH(2), and HH(2), as shown in FIG. 2, outputs the data LL(2) to the encoding circuit 105, and stores that data in the frame memory 102. Also, generated data HL(2), LH(2), and HH(2) are encoded by the encoding circuit 104, as described above, and the encoded data are output to the multiplexer 107 and are stored in the memory 109. At the same time, the encoding circuit 105 encodes LL(2) and outputs encoded data to the multiplexer 107. The encoding circuit 106 encodes data LL(1) in the same manner as described above, and outputs the encoded data to the selector 115. The selector 115 determines whether or not LL(1) is to be directly encoded or is encoded after it is divided into LL(2), HL(2), LH(2), and HH(2), by comparing the counter values of their encoded data. When the operation condition of the selector 115 is not satisfied, the second repetition process (the same process as that for LL(1)) for LL(2) stored in the frame memory 102 is done.

The aforementioned process is repeated until the selector 115 satisfies the operation condition.

With the above repetition processes, the multi-valued image to be encoded can undergo an appropriate number of times of wavelet transform (including zero) so as to minimize the final code length.

As described above, the operation of the selector 115 may be executed in the first process, i.e., at the time of the aforementioned selection process based on the coding efficiency obtained upon encoding original image data LL(0) before the discrete wavelet transform shown in FIG. 2, and that upon encoding LL(1), HL(1), LH(1), and HH(1) after the discrete wavelet transform, or may end at the time of the selection process of encoded data on the basis of coding efficiency obtained upon encoding LL(1) again by the aforementioned repetition process, and that obtained upon encoding LL(2), HL(2), LH(2), and HH(2) obtained by further computing discrete wavelet transforms of LL(1). That is, the operation timing of the selector 115 varies depending on the characteristics of an image to be encoded.

Figure 3:
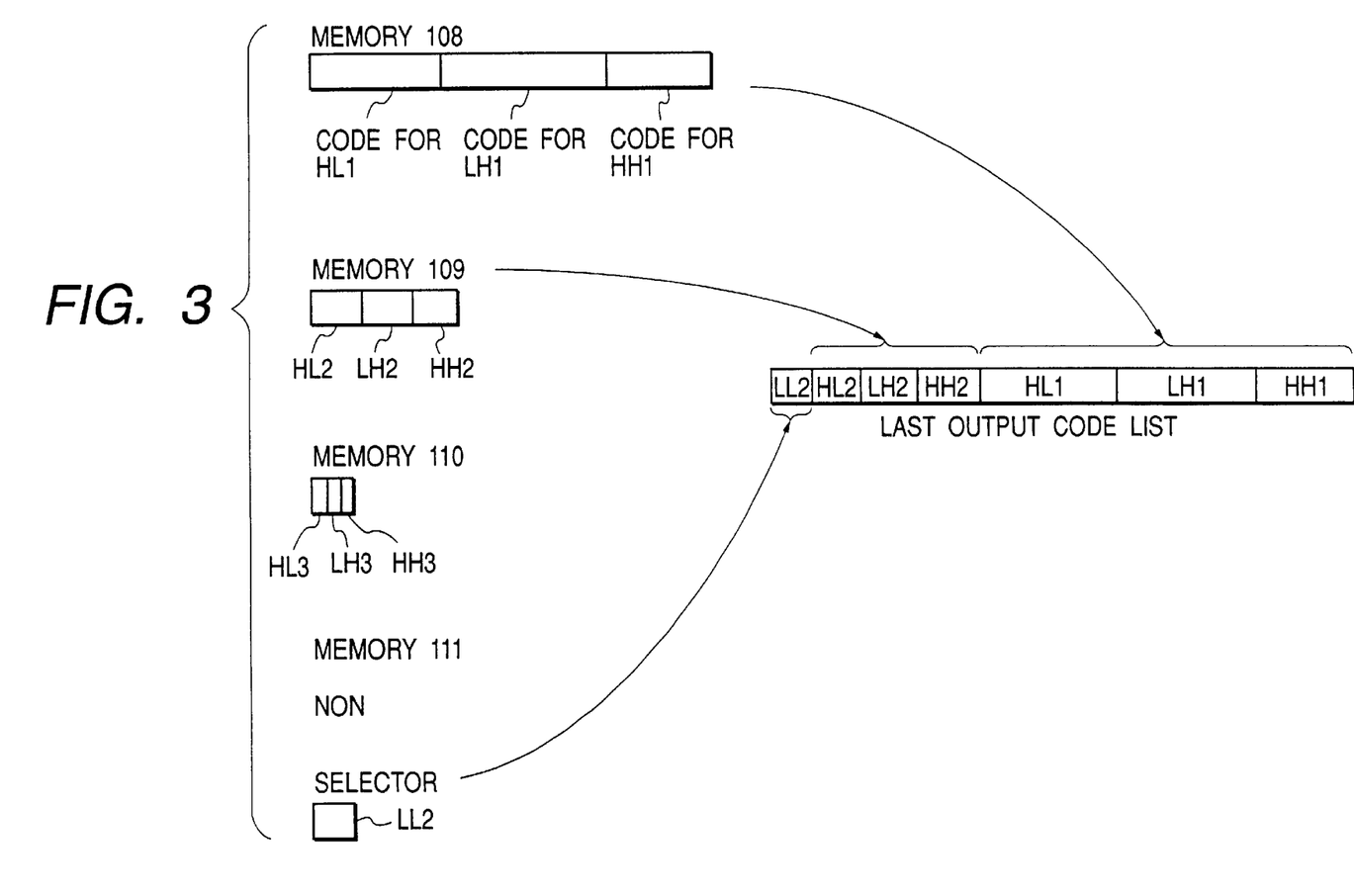
FIG. 3 is a view showing the coupling state of code sequences by a multiplexer 118.

The multiplexer 118 on the output side operates only when the selector 115 outputs encoded data. The multiplexer 118 multiplexes the output code from the selector 115 and those stored in turn in the memories 111, ..., 110, 109, and 108 as needed. The multiplexer 118 outputs the multiplexed encoded data to a code output unit 119.

Note that data are not read out from the memories after that connected by the switch 117 (i.e., the memories that store encoded data corresponding to levels equal to or higher than the frequency bands HL(m), LH(m), and HH(m)). This is because the frequency bands HL(m), LH(m), and HH(m) corresponding to a level higher than that of HL(m−1), LH(m−1), and HH(m−1) are not necessary as encoded data, since the frequency band corresponding to the encoded data output from the selector 115 corresponds to LL(m−1) or LL(m), HL(m), LH(m), and HH(m).

An output code in this embodiment is passed to the code output unit 119. The code output unit 119 comprises, e.g., a storage device such as a hard disk, memory, or the like, an interface for a network line, or the like.

With the above-mentioned processes, according to this embodiment, multi-valued image data can be efficiently encoded. Note that the size information of an image, information indicating the waveform transform level count, information indicating the number of bits per pixel, and the like, required for decoding are appropriately appended to the generated encoded data.

Second Embodiment

In the first embodiment described above, an appropriate level count is determined on the basis of the actual code length of encoded data obtained after different numbers of times of discrete wavelet transform. However, the present invention is not limited to such specific method. That is, the level count or execution/non-execution of the discrete wavelet transform may be determined based on other factors as long as the coding efficiencies can be compared. The difference between the first and second embodiments will be described in detail below.

Figure 4:
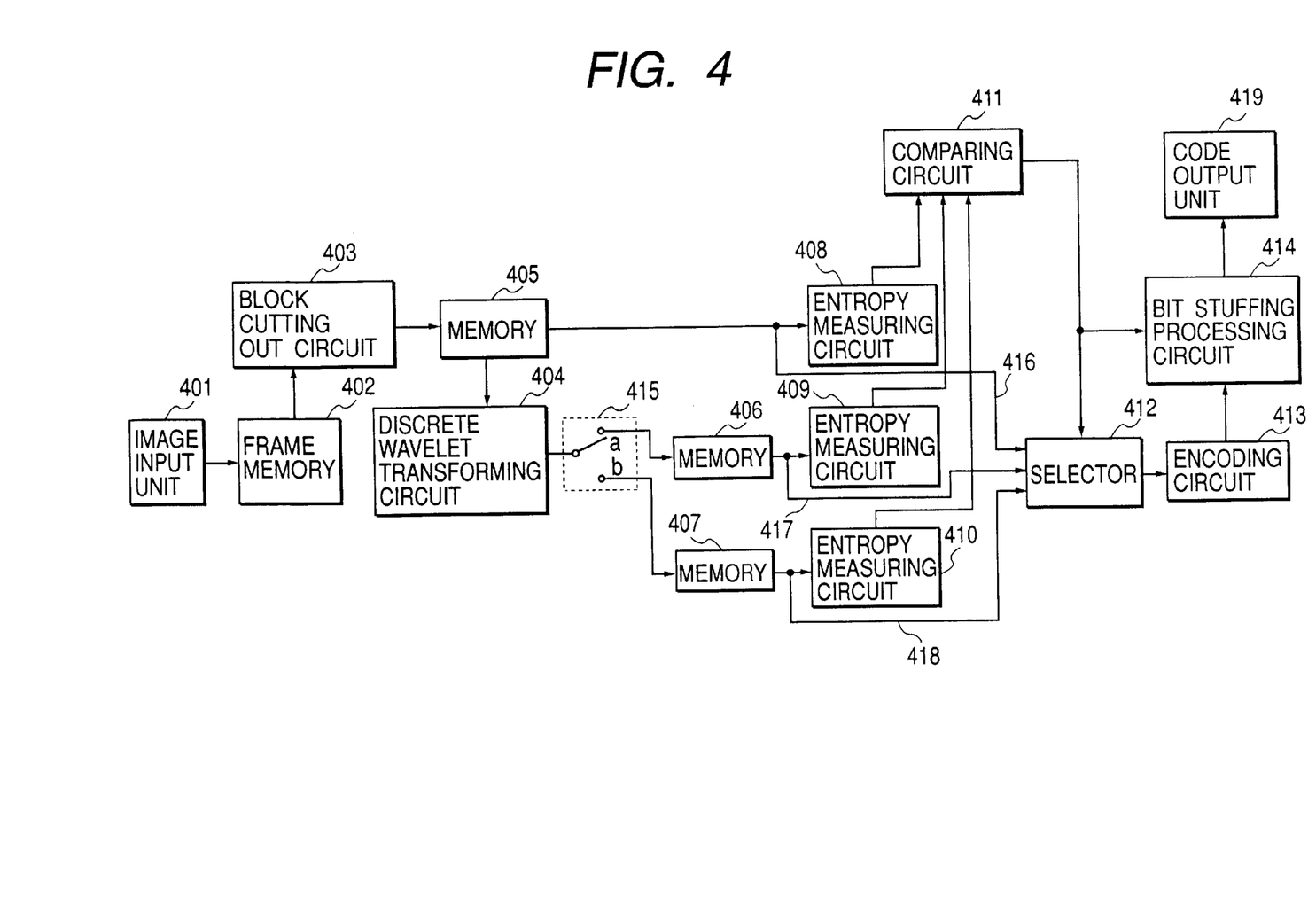
FIG. 4 is a block diagram of the second embodiment.

FIG. 4 is a block diagram for implementing the second embodiment according to the present invention. Referring to FIG. 4, an image input unit 401 inputs multi-valued image data for one frame, and a frame memory 402 stores the input multi-valued image data for one frame.

As in the first embodiment, the image input unit 401 may comprise, e.g., an image sensing device such as a scanner, a digital camera or the like, an interface for a network line, or the like. The apparatus shown in FIG. 4 also comprises a block cutting out circuit 403, a discrete wavelet transforming circuit 404, memories 405, 406, and 407, entropy measuring circuits 408, 409, and 410, a comparing circuit 411, a selector 412, an encoding circuit 413, a bit stuffing processing circuit 414, a switch 415, signal lines 416, 417, and 418, and a code output unit 419.

In the description of this embodiment, assume that 8-bit monochrome image data is encoded. However, the present invention is not limited to such specific image, and may be applied to encoding of a color multi-valued image as in the first embodiment. The present invention can also be applied to a case wherein multi-valued image data indicating states of pixels in an image area are to be encoded, e.g., when the colors of the respective pixels are indicated by index values to a color table, and are to be encoded.

Multi-valued image data to be encoded is input from the image input unit 401, and is stored in the frame memory 402. The block cutting out circuit 403 segments image data stored in the frame memory 402 into 128×128 blocks, extracts the blocks in turn from the upper left corner, and stores them in the memory 405.

Initially, the switch 415 is connected to terminal a. The discrete wavelet transforming circuit 404 computes the discrete wavelet transforms of the 128×128 image blocks stored in the memory 405, and generates transform coefficients of four frequency bands LL(1), HL(1), LH(1), and HH(1). In this embodiment, the discrete wavelet transform of an image data sequence x(n) is computed by:

$$r(n)=[(x(2n)+x(2n+1))/2]$$

$$d(n)=x(2n+2)-x(2n+3)+[(-r(n)+r(n+2)+2)/4]$$

where [a] indicates a maximum integer that does not exceed a. r(n) and d(n) are transform coefficients, and respectively indicate low- and high-frequency components. These transformation formulas are for linear data. By computing the transforms in the order of the horizontal and vertical directions, two-dimensional transformation is done, as shown in FIG. 6.

The transform coefficients are stored in the memory 406 via the switch 415. Then, the switch 415 is connected to terminal b to further compute the wavelet transforms of LL(1), thus generating transform coefficients of seven frequency bands LL(2), HL(2), LH(2), HH(2), HL(1), LH(1), and HH(1). These coefficients are stored in the memory 407 via the switch 415.

The entropy measuring circuit 408 measures and outputs the memoryless entropies of the image blocks stored in the memory 405. Likewise, the entropy measuring circuit 409 measures and outputs the memoryless entropies of the transform coefficients stored in the memory 406. Note that the entropy measuring circuit 409 measures the entropies in units of frequency bands. That is, the entropy to be output is computed by:

$$H=(HLL(1)+HHL(1)+HLH(1)+HHH(1))/16)$$

where HLL(1), HHL(1), HLH(1), and HHH(1) are respectively memoryless entropy values of LL(1), HL(1), LH(1), and HH(1).

The entropy measuring circuit 410 similarly measures and outputs the memoryless entropies of the transform coefficients stored in the memory 407. In this case, the entropy is measured in units of frequency bands. The entropy to be output is computed by:

$$H=(HLL(2)+HHL(2)+HLH(2)+HHH(2)/16) +(HHL(1)+HLH(1)+HHH(1)/4)$$

where HLL(2), HHL(2), HLH(2), HHH(2), HHL(1), HLH (1), and HHH(1) are respectively the memoryless entropy values of LL(2), HL(2), LH(2), HH(2), HL(1), LH(1), and HH(1).

The comparing circuit 411 compares the entropy values output from the entropy measuring circuits 408, 409, and 410, and outputs a value indicating the circuit that outputs the minimum value to the selector 412. When the output value from the entropy measuring circuit 410 is the smallest, "2" is output; when the output value from the entropy measuring circuit 409, "1"; otherwise, "0".

The selector 412 selects and outputs a sequence corresponding to the minimum entropy value from those on the signal lines 416, 417, and 418 with reference to the output value from the comparing circuit 411. More specifically, when the output value from the comparing circuit 411 is "0", the selector 412 selects a sequence on the signal line 416; when the output value is "1", a sequence on the signal line 417; and when the output value is "2", a sequence on the signal line 418.

The encoding circuit 413 encodes an input data sequence, and generates and outputs a code sequence. The encoding method in the encoding circuit 413 is the same as that in the encoding circuit 104 in the first embodiment. In the first embodiment, block division is done in units of frequency bands HL, LH, and HH, but in this embodiment, each 128×128 block is encoded as a block to be encoded while being appropriately broken up regardless of the frequency bands.

The bit stuffing processing circuit 414 appends a marker indicating a block boundary and a wavelet transform level count to the code sequence output from the encoding circuit 413, and assures a marker area by the bit stuffing process to distinguish the marker from the code sequence. That is, the circuit 414 appends 8-bit data "FF" in hexadecimal notation, i.e., "11111111" to the head of the code sequence output from the encoding circuit 413. Then, the circuit 414 adds 128 to the output from the comparing circuit 411, and appends the sum as 8-bit data to the code sequence. For example, when the output from the comparing circuit is "1", "FF81" in hexadecimal notation, i.e., "1111111110000001" is appended to the head of the sequence.

The circuit 414 divides the output code sequence at byte boundaries, i.e., in units of 8 bits, and if the 8 bits indicate "FF" in hexadecimal notation, the circuit 414 inserts and outputs "0" immediately after the 8 bits. In this manner, upon checking the code sequence in units of bytes, if 1 byte that follows "FF" in hexadecimal notation indicates a value equal to or larger than "80" in hexadecimal notation, it is determined that the 1 byte is a marker indicating the head of the 128×128 block, and the wavelet transform level can also be determined from that value.

Figure 5:
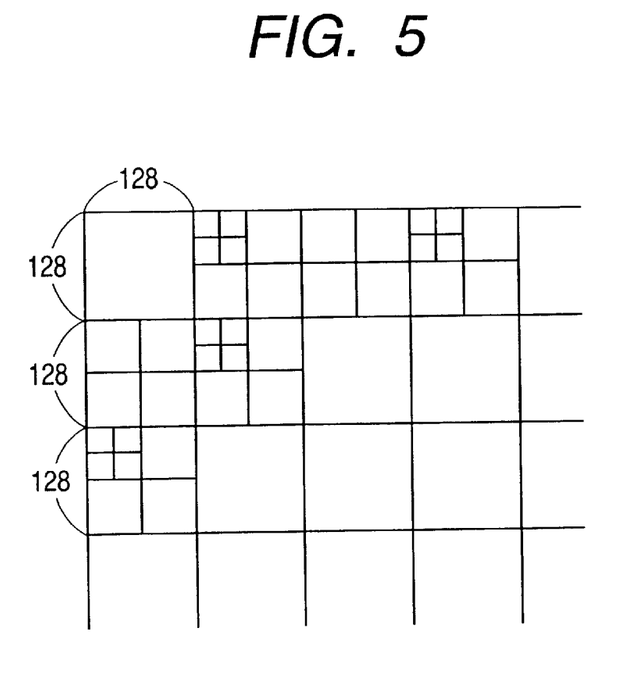
FIG. 5 is a view showing the state after the block division and discrete wavelet transform.
Figure 8:
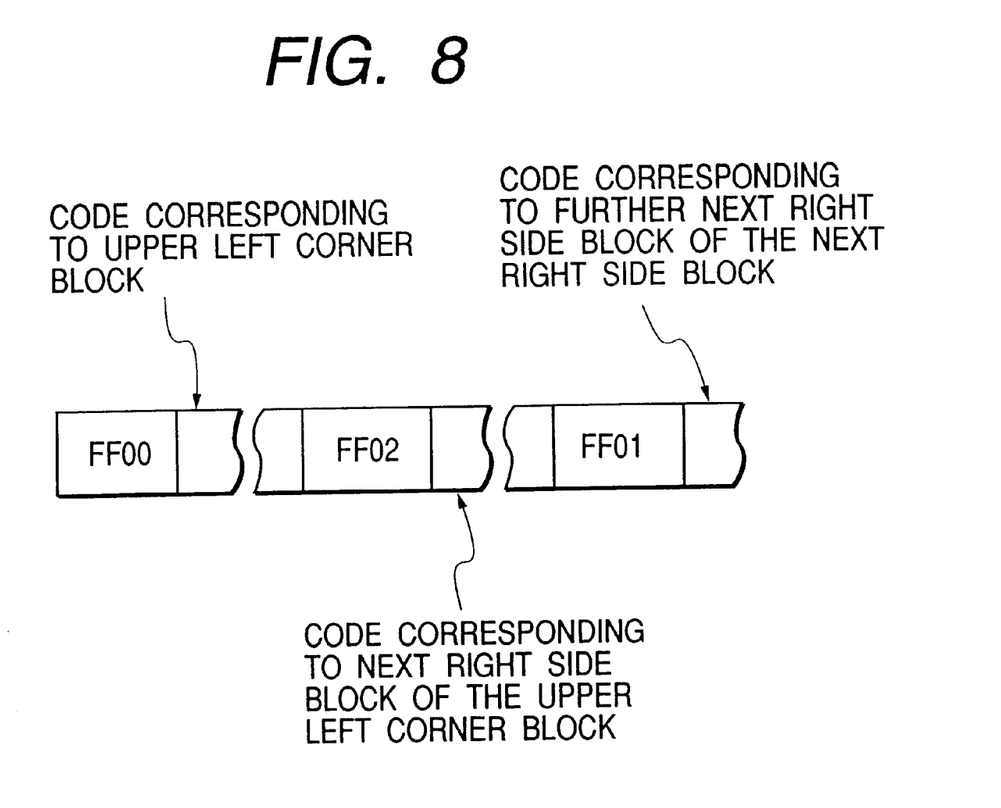
FIG. 8 is a view showing an example of an encoded data sequence output by the second embodiment.

FIG. 5 illustrates the wavelet division in units of blocks according to this embodiment. A given block is encoded without any wavelet transform, and another block is encoded after it undergoes the level 1 or 2 wavelet transform. FIG. 8 shows output codes for three horizontally successive blocks from the upper left corner block.

The code output unit 419 outputs the generated codes. The code output unit 419 comprises, e.g., a storage device such as a hard disk, memory, or the like, an interface for a network line, or the like.

With the aforementioned processes, multi-valued image data can be efficiently encoded.

Note that the size of an image, the number of bits per pixel, and the like, which are required for decoding are appropriately appended to the generated code sequence. In this embodiment, since appropriate wavelet transform level counts are selected in units of blocks, highly efficient encoding can be done in correspondence with the local natures of an image, and since an image is divided in units of blocks, only a portion that the user wants to see can be quickly decoded.

Another Embodiment

The present invention is not limited to the above embodiments. For example, the discrete wavelet transform is not limited to that used in this embodiment. As the encoding method of the transform coefficients, the schemes based on the JPEG reversible process and block division have been exemplified, but other schemes may be used.

As the method of determining the appropriate number of times of application of the transforming means, the actual code lengths or entropy values are compared in the above embodiments. However, the present invention is not limited to such specific methods. For example, the appropriate number of times of application of the transforming means may be determined using the successive state of identical pixel values, the number of grayscale levels used in an image or block, or the like as a measure.

Note that the present invention may be applied to one unit of either a system constituted by a plurality of equipments (e.g., a host computer, an interface device, a reader, a printer, and the like), or an apparatus consisting of a single equipment (e.g., a copying machine, a facsimile apparatus, or the like).

The present invention is not limited to the apparatus and method for implementing the above embodiments. The scope of the present invention also includes a case wherein the embodiments are implemented by supplying a memory medium, which records a program code of software that can implement the functions of the above-mentioned embodiments to a computer (CPU or MPU) of a system or apparatus, and reading out and executing the program code stored in the storage medium by the computer of the system or apparatus.

In this case, the program code itself of software read implements the functions of the above-mentioned embodiments, and the program code itself and means for supplying the program code to the computer, i.e., a storage medium which stores the program code are included in the scope of the present invention.

As the storage medium for supplying the program code, for example, a floppy disk, hard disk, optical disk, magneto-optical disk, CD-ROM, magnetic tape, nonvolatile memory card, ROM, and the like may be used.

Also, the program code is included in the scope of the present invention when the functions of the above-mentioned embodiments are implemented not only by controlling various devices according to the supplied program code alone but also by the program code in cooperation with an OS (operating system) or another application software, which is running on the computer.

Furthermore, the scope of the present invention includes a case wherein the above embodiments are implemented by some or all actual processes executed by a CPU or the like of a function extension board or a function extension unit, which is inserted in or connected to the computer, after the program code read out from the storage medium is stored in a memory of the function extension board or unit.

As described above, according to the above embodiments, since image data can be transformed into coefficients corresponding to a plurality of frequency bands by an appropriate number of times of transform (level), image data can be efficiently encoded. Especially, in image encoding using the discrete wavelet transform, image data having various characteristics can undergo wavelet transforms up to an appropriate level, resulting in high coding efficiency. When the image to be encoded is divided into blocks, and the aforementioned level selection is done in units of levels, an appropriate level can be selected in correspondence with the local nature of an image, thus implementing further efficient encoding.

To restate, according to the present invention, images having various characteristics can be efficiently encoded. Especially, in an arrangement that can transform an input image into a plurality of frequency bands, encoding can be efficiently done in correspondence with the characteristics of the image to be encoded.

What is claimed is:

1. An image processing apparatus comprising:

generation means for generating a plurality of sample values representing an image;

transforming means for transforming the plurality of sample values into a plurality of frequency bands LL(m−1), LH(m−1), HL(m−1) and HH(m−1) by wavelet-transform, and transforming one of the bands into a plurality of frequency bands LL(m), LH(m), HL(m) and HH(m) by wavelet-transform;

encoding means for generating first encoded data by encoding the one band to be transformed into the frequency bands LL(m), LH(m), HL(m) and HH(m), and generating second encoded data by encoding the frequency bands LL(m), LH(m), HL(m) and HH(m) obtained by said transforming means;

comparing means for comparing amounts of the first and second encoded data obtained by encoding of said encoding means; and selection means for outputting one of the first and second encoded data in accordance with a comparison result of said comparing means.

2. An apparatus according to claim 1, wherein the one band to be transformed into the frequency bands LL(m), LH(m) HL(m), and HH(m) is LL(m−1).

3. An apparatus according to claim 1, wherein the image is expressed by a plurality of color components, and wherein said generation means generates the plurality of sample values corresponding to each color component so as to encode each of the plurality of color components.

4. An apparatus according to claim 1, wherein the image is expressed by luminance and chrominance components, and wherein said generation means generates the plurality of sample values corresponding to each component so as to encode each of the luminance and chrominance components.

5. An apparatus according to claim 1, further comprising addition means for outputting additional data which compensates for a high-frequency component of an image expressed by the encoded data output from said selection means.

6. An apparatus according to claim 5, further comprising output means for multiplexing and outputting the encoded data output from said selection means, and the additional data.

7. An apparatus according to claim 1, wherein the encoding done by said encoding means is entropy coding.

8. An apparatus according to claim 7, wherein the entropy coding is Huffman coding.

9. An apparatus according to claim 7, wherein the entropy coding is arithmetic coding.

10. An image processing method comprising:

a generation step, of generating a plurality of sample values representing an image;

a transforming step, of transforming the plurality of sample values into a plurality of frequency bands LL(m−1), LH(m−1), HL(m−1) and HH(m−1) by wavelet-transform, and transforming one of the bands into a plurality of frequency bands LL(m), LH(m), HL(m) and HH(m) by wavelet-transformn;

an encoding step, of generating first encoded data by encoding the one band to be transformed into the frequency bands LL(m), LH(m), HL(m) and HH(m), and generating second encoded data by encoding the frequency bands LL(m), LH(m), HL(m) and HH(m) obtained in the transforming step;

a comparing step, of comparing amounts of the first and second encoded data obtained by encoding in the encoding step; and a selection step, of outputting one of the first and second encoded data in accordance with a comparison result in the comparing step.

11. A storage medium that computer-readably stores a program for implementing an image processing method, said image processing method comprising:

a generation step, of generating a plurality of sample values representing an image;

a transforming step, of transforming the plurality of sample values into a plurality of frequency bands LL(m−1), LH(m−1), HL(m−1) and HH(m−1) by wavelet-transform, and transforming one of the bands into a plurality of frequency bands LL(m), LH(m), HL(m) and HH(m) by wavelet-transform;

an encoding step, of generating first encoded data by encoding the one band to be transformed into the frequency bands LL(m), LH(m), HL(m) and HH(m), and generating second encoded data by encoding the frequency bands LL(m), LH(m), HL(m) and HH(m) obtained in the transforming step;

a comparing step, of comparing amounts of the first and second encoded data obtained by encoding in the encoding step; and a selection step, of outputting one of the first and second encoded data in accordance with a comparison result in the comparing step.

* * * * *

UNITED STATES PATENT AND TRADEMARK OFFICE
CERTIFICATE OF CORRECTION

Figure 7:
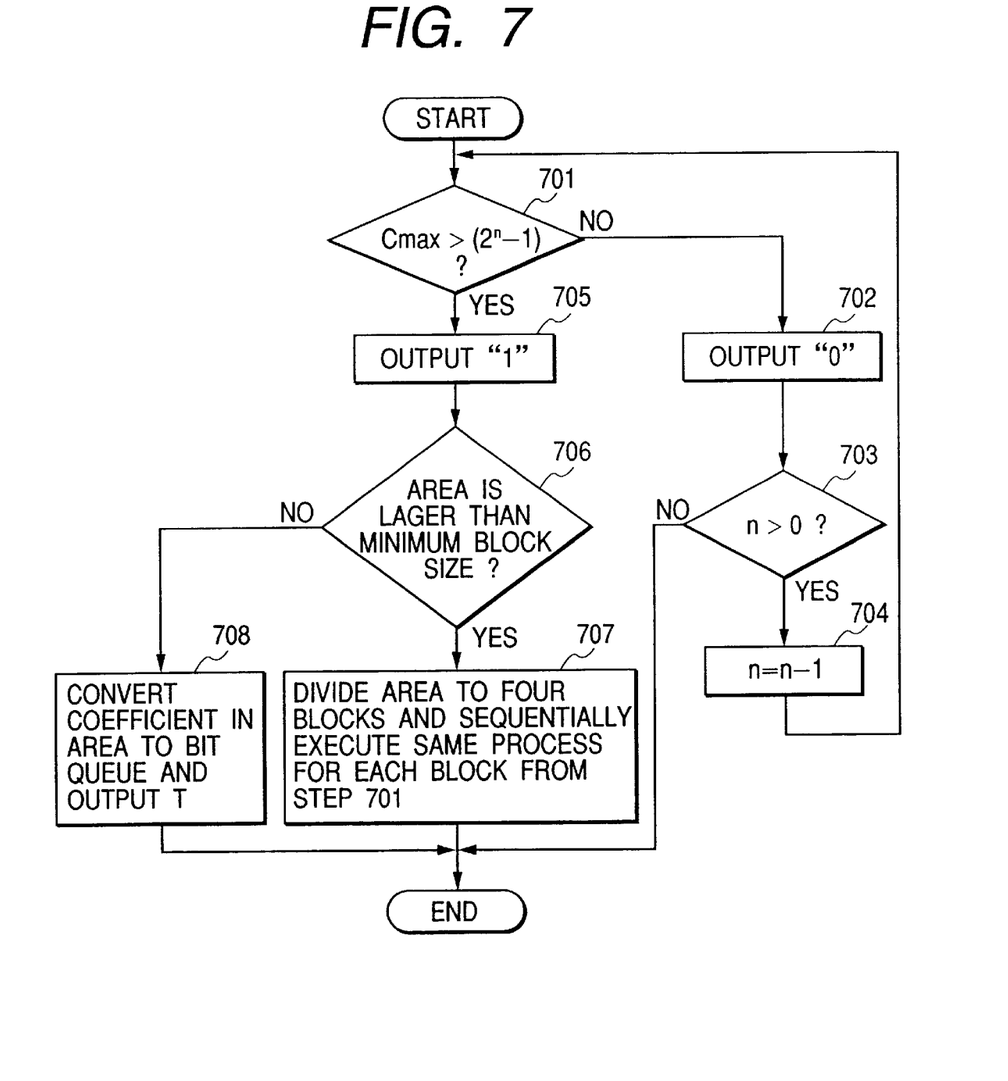
FIG. 7 is a flow chart showing the processing flow of an encoding circuit 104 or 413.

PATENT NO. : 6,501,859 B1  Page 1 of 1
DATED : December 31, 2002
INVENTOR(S) : Hiroshi Kajiwara It is certified that error appears in the above-identified patent and that said Letters Patent is hereby corrected as shown below:

Drawings,
Sheet 6, Fig. 7, "LAGER" should read -- LARGER --.

Column 1,
Line 64, "(tile) sizes)," should read -- (tile sizes), --.

Column 12,
Line 60, "LH(m) HL(m)," should read -- LH(m), HL(m), --.

Signed and Sealed this

Twentieth Day of January, 2004

JON W. DUDAS
*Acting Director of the United States Patent and Trademark Office*